US012666256B2

(12) United States Patent　　(10) Patent No.:　US 12,666,256 B2

Stevens　　(45) Date of Patent:　Jun. 23, 2026

(54) SYSTEM AND METHOD FOR NETWORKING AND INTERNET PROTOCOL SECURITY (IPSec) MEASURES FOR MOBILE AD HOC NETWORK (MANET) WAVEFORMS

(71) Applicant: Rockwell Collins, Inc., Cedar Rapids, IA (US)

(72) Inventor: James A Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 26 days.

(21) Appl. No.: 18/907,290

(22) Filed: Oct. 4, 2024

(65) Prior Publication Data

US 2025/0119730 A1　　Apr. 10, 2025

Related U.S. Application Data

(60) Provisional application No. 63/542,953, filed on Oct. 6, 2023.

(51) Int. Cl.
H04W 12/033　　(2021.01)
H04W 12/102　　(2021.01)

(52) U.S. Cl.
CPC ....... H04W 12/033 (2021.01); H04W 12/102 (2021.01)

(58) Field of Classification Search
CPC .. H04W 12/102; H04W 12/033; H04W 12/03
USPC ........................................................ 380/270
See application file for complete search history.

(56) References Cited

U.S. PATENT DOCUMENTS

| | | | |
|---|---|---|---|
| 8,995,275 B1 | 3/2015 | Iovine et al. | |
| 9,461,975 B2 * | 10/2016 | Elzur | H04L 9/083 |
| 9,596,077 B2 * | 3/2017 | Johnson | G06F 21/53 |
| 10,299,114 B1 | 5/2019 | Stevens et al. | |
| 11,122,079 B1 | 9/2021 | Aloisio et al. | |
| 11,343,715 B1 | 5/2022 | Barbulescu et al. | |
| 11,356,925 B1 | 6/2022 | Stevens et al. | |
| 11,368,298 B2 * | 6/2022 | Mestery | H04L 63/0428 |
| 11,622,030 B2 | 4/2023 | Minaburo et al. | |

(Continued)

FOREIGN PATENT DOCUMENTS

| | | |
|---|---|---|
| AU | 2021106066 A4 | 11/2021 |
| CA | 2515513 A1 | 9/2004 |
| EP | 3968612 A1 | 3/2022 |

*Primary Examiner* — Amare F Tabor
(74) *Attorney, Agent, or Firm* — Suiter Swantz IP

(57)　　ABSTRACT

A node of a network communicating via mobile ad hoc network (MANET) waveforms and incorporating internet protocol (IP) security (IPSec) measures includes a plaintext (PT) user system or host, ciphertext (CT) communications module including a radio system for transmission and reception via MANET waveforms, IPSec cryptographic units, and PT and CT convergence modules. IPSec units provide encryption and decryption of data traffic as well as cross-layer exchange between PT and CT convergence modules. PT convergence modules map output traffic and decrypted input traffic to CT capabilities and exchange reachability information (e.g., addresses of reachable nodes or systems) with counterpart PT convergence modules of peer nodes of the MANET. CT convergence modules converge encrypted input and output traffic based on CT capabilities.

17 Claims, 8 Drawing Sheets

(56)        References Cited

U.S. PATENT DOCUMENTS

| | | | |
|---|---|---|---|
| 2009/0025080 A1* | 1/2009 | Lund | H04L 63/166 |
| | | | 726/15 |
| 2012/0254615 A1* | 10/2012 | Ma | H04W 12/041 |
| | | | 713/168 |
| 2022/0108207 A1 | 4/2022 | Graf et al. | |
| 2023/0180012 A1 | 6/2023 | Thommana et al. | |

* cited by examiner

300 ⬎

| SYS ADDR TO X | |
|---|---|
| Version | 2 |
| X | SEDR Sys Addr |
| 0 | 47 |
| 1 | 901 |
| 2 | 361 |
| 3 | 12,411 |
| 4 | Empty |
| 5 | Empty |
| ... | ... |
| N – 2 | Empty |
| N – 1 | Empty |

300a ⬎

| SYS ADDR TO X | |
|---|---|
| Version | 2 (unchanged) |
| X | SEDR Sys Addr |
| 0 | 47 |
| 1 | 901 |
| 2 | 361 |
| 3 | 12,411 |
| 4 | 405 |
| 5 | Empty |
| ... | ... |
| N – 2 | Empty |
| N – 1 | Empty |

300b ⬎

| SYS ADDR TO X | |
|---|---|
| Version | 3 |
| X | SEDR Sys Addr |
| 0 | 47 |
| 1 | 901 |
| 2 | 955 |
| 3 | 12,411 |
| 4 | 405 |
| 5 | Empty |
| ... | ... |
| N – 2 | Empty |
| N – 1 | Empty |

| DAC | Default All-Cast | 239.255.254.231 | Multicast to all SEDR nodes in network |
|---|---|---|---|
| D1H | Default One-Hop | 239.255.254.230 | Multicast to all SEDR notes one RF hop away |
| UEM-X | Unicast Equivalent Multicast-X | 239.251.x1.x2 | Multicast to only one SEDR node that joins this group (X can range from 0 to N – 1) |

| | Host PT Src/Dest | | PT-Conv Tunnel Src/Dest | | IPSec CT Hdr Src/Dest | | Waveform Src/Dest |
|---|---|---|---|---|---|---|---|
| [1] | | [2] | | [3] | | [4] | |
| | Unicast | | UEM-X | | UEM-X | | Single Radio |
| | Multicast | | D1H DAC | | D1H DAC | | One-hop Broadcast ALL-cast |
| | DAC | | DAC | | DAC | | ALL-cast |
| | D1H | | D1H | | D1H | | One-hop broadcast |

Traffic

Control

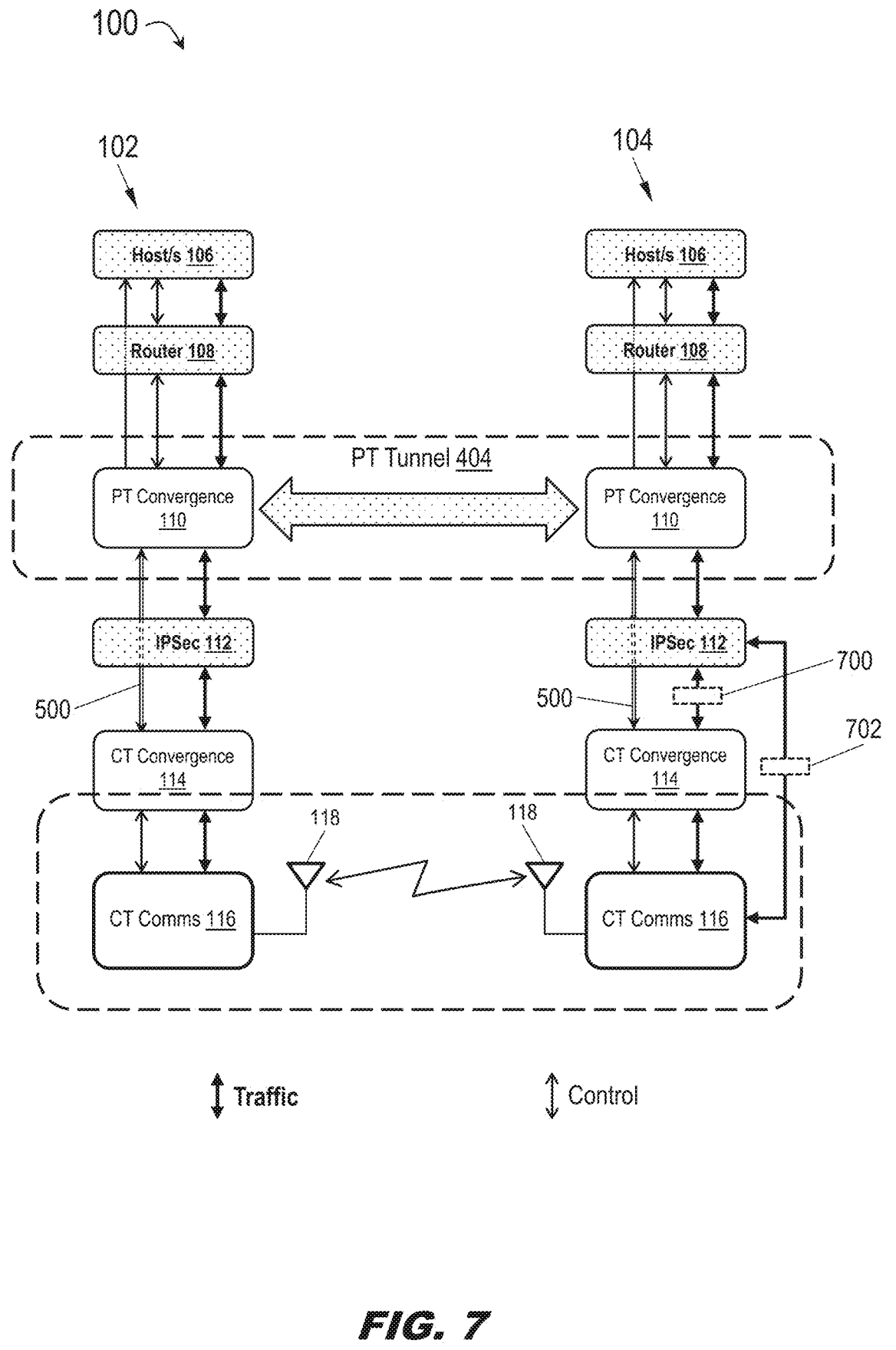

100

102

104

Host/s 106

Router 108

PT Tunnel 404

PT Convergence 110

PT Convergence 110

IPSec 112

500

700

500

702

CT Convergence 114

CT Convergence 114

118

118

CT Comms 116

CT Comms 116

Host/s 106

Router 108

IPSec 112

↕ Traffic          ↕ Control

*FIG. 7*

SYSTEM AND METHOD FOR NETWORKING AND INTERNET PROTOCOL SECURITY (IPSec) MEASURES FOR MOBILE AD HOC NETWORK (MANET) WAVEFORMS

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. Provisional Patent Application Ser. No. 63/542,953 filed Oct. 6, 2023 and titled SYSTEM AND METHOD FOR NETWORKING AND INTERNET PROTOCOL SECU-RITY (IPSEC) MEASURES FOR MOBILE AD HOC NET-WORK (MANET) WAVEFORMS;

Said U.S. Provisional Patent Application 63/542,953 is herein incorporated by reference in its entirety.

BACKGROUND

Waveform evolutions provide added robustness for tacti-cal communications platforms and/or software defined radio (SDR) systems in terms of anti-jamming capabilities (as just one example) but also provide communications security (COMSEC) to protect user traffic for confidentiality from being read or modified. Many mobile ad hoc networks (MANET) networking waveforms support internet Protocol (IP) traffic and need a way to secure the traffic. For many MANET waveforms, such as Warrior Robust Enhanced Network (WREN) and Soldier Radio Waveform (SRW), custom bespoke COMSEC solutions were created to support Black (encrypted, ciphertext (CT))/Red (unencrypted, plain-text (PT)) cross layer information exchanges for example to use Black lower layer protocol reachability information to reduce the overhead of Red routing protocols. Such custom bespoke COMSEC solutions embedded in MANET wave-forms complicate the development and certification of those waveforms. Commercial and military Internet Protocol Security (IPsec) End Cryptographic Units (ECUs) are avail-able that could be used to speed up MANET development and simplify MANET security requirements. Unfortunately, these IPsec ECUs do not support cross-layer bypasses and have higher over-the-air overhead than custom bespoke COMSEC solutions. Thus, an approach is needed to provide MANET waveform bespoke COMSEC like cross-layer bypass exchanges and reduce over-the-air overhead while using unmodified IPsec ECUs including military IPsec ECUs (including, but not limited to, HAIPE and NINE). Current military IPSec devices either support preplaced keys (PPK) which requires significant pre-mission coordination and configuration planning or else use high overhead Inter-net Key Exchange (IKE) message exchanges to learn Red/Black addresses and obtain encryption keys. Challenges associated with using IPsec ECUs include efficient low-overhead red/black address discover, simple discovery of Security Associations (SAs) and keys, and mapping of IPsec IP packets to the lower layer MANET waveforms.

Combining IPSec measures with MANET waveforms presents a multilayered problem to be solved. For example, with respect to combining plaintext (PT) IP networking with next-generation MANET waveforms, a challenge for MANET nodes is how to determine which nodes of a given communications network are reachable through or via a particular MANET node (e.g., as a gateway). Further, IPSec ECUs must determine and/or load SAs including, e.g., plaintext (PT) and ciphertext (CT) addresses and/or encryp-tion keys. Further still, at the waveform/radio frequency (RF) level, radio systems must determine how to map IP packets (e.g., IP source and destination addresses) into waveform data services (e.g., waveform source and desti-nation addresses).

One approach to this multilayered challenge is for a network planner to learn the IP addressing at all platforms throughout the network and prepare a full configuration of red-to-black IP addressing and IPSec SAs and keys at all platforms, distributing and loading this configuration at all platforms. However, this approach may be difficult to ini-tially coordinate and does not allow for easy integration or entry of unplanned platforms during a mission. Another approach involves fully dynamic discovery, where all plat-forms are independently configured and independently receive public and private encryption keys. Platforms enter-ing the network then perform dynamic IKE discovery and dynamic red routing. However, this approach may result in long delays between network entry and exchange of data traffic due to the high overhead involved.

SUMMARY

In an aspect, a communications node of a communica-tions network is disclosed. In embodiments, the node includes one or more plaintext (PT) user systems (e.g., hosts and/or routers) for sending and receiving user traffic to and from other peer nodes of the network according to internet protocol (IP) security (IPSec) protocols. Connected to the PT user systems are PT convergence modules for mapping or converging output traffic to ciphertext (CT) capabilities prior to encryption of the traffic data packets (e.g., a CT destination address at the receiving node, a packet priority or other quality of service (QOS) associated with the output traffic, or a packet size such as maximum transmission unit (MTU) limits for transmitted packets. PT convergence mod-ules may likewise converge decrypted input traffic based on these capabilities. Further, PT convergence modules exchange reachability information (e.g., other nodes whose hosts or routers are accessible via a peer node, if for example the peer node is a gateway node) with peer PT convergence modules at peer nodes of the network. In embodiments, the node further includes ciphertext (CT) convergence and communication modules. For example, CT convergence modules converge encrypted output and input traffic based on the CT capabilities, while CT communications modules transmit output traffic and receive input traffic to and from peer nodes, e.g., via radio system and/or mobile ad hoc network (MANET) waveforms. Between the PT and CT convergence modules, IPSec cryptographic units encrypt and decrypt output and input data traffic according to IPSec protocols. Further still, IPSec cryptographic units provide for cross-layer exchanges of reachability information between PT and CT convergence modules within the node.

In some embodiments, reachability information includes CT reachability information, e.g., a CT source or destination address associated with a peer CT interface between a peer IPSec unit and a peer CT communications module at a peer node. Alternatively or additionally, the CT destination address refers to a CT interface between the peer IPSec unit and a peer CT convergence module at the peer node. In some embodiments, reachability information includes PT reachability information, e.g., addresses of peer hosts and/or routers at the peer node.

In some embodiments, PT reachability information associated with control traffic exchanges includes a unicast equivalent multicast (UEM) address of the peer PT convergence module (e.g., if the peer CT convergence module at the peer node joins the peer node to a UEM-X group consisting solely of the peer node).

In some embodiments, CT reachability information likewise includes a UEM address of the peer CT interface.

In some embodiments, the PT convergence module exchanges output or input traffic with the peer node via a PT tunnel to the peer PT convergence module.

In some embodiments, the PT tunnel provides for a) a default all-case (DAC) exchange with all peer nodes of the network (e.g., via their PT convergence modules; b) a default one-hop (D1H) exchange to all peer nodes exactly one RF hop away from the communications node; and/or c) a unicast equivalent multicast (UEM, UEM-X) to a multicast group consisting solely of a peer node X that has been joined to the group.

In some embodiments, the reachability information includes one or more of: a count of RF relay hops between the communications node and a peer CT convergence module at a peer node; a quality of service (QOS; e.g., packet priority) at the peer CT convergence module; a request for reserved transmission capacity; an indicator of reserved capacity responsive to such a request; or a node status at the peer CT convergence module (e.g., an indicator that a peer node is a gateway node via which other nodes are reachable).

In some embodiments, the CT communications module includes an RF radio system for transmission and reception of output and input traffic according to network waveforms and/or associated protocols.

In some embodiments, cross-layer information exchanged between PT and CT convergence modules includes a radio address of the RF radio system.

In some embodiments, the network is a homogeneous network of a single network or node type, e.g., fiber, optical, cellular, IP, RF, or MANET. In some embodiments, the network is a heterogeneous network comprising two or more of these network types.

In some embodiments, the IPSec unit provides for cross-layer exchanges between the PT and CT convergence modules via Internet Control Message Protocol (IGMP) bypass.

In some embodiments, cross-layer information includes an IGMP address indicative of message type and/or message content.

In some embodiments, IGMP message content includes QOS information associated with the CT convergence module (e.g., packet priority); QOS mapping to a Differentiated Services Code Point (DSCP) passed with traffic; an identifier of a UEM group; an indicator that a peer node is one RF hop from the communications node (which may not include an address of the peer node); an indicator that the peer node is two or more RF hops away; a gateway node status of the peer node; and/or an indicator of reachability information to transmit (e.g., PT-Tx flag).

In some embodiments, the PT convergence module provides additional levels of encryption, e.g., pre-encryption of output traffic prior to encryption by the IPSec units or post-decryption of input traffic subsequent to IPSec decryption.

In some embodiments, the CT convergence module provides additional levels of encryption, e.g., post-encryption of output traffic subsequent to encryption by the IPSec units or pre-decryption of input traffic prior to IPSec decryption.

In some embodiments, the communications node is associated with multiple Multiple Independent Levels of Security (MILS) enclaves, each enclave having a different MILS security level, and the node including a dedicated PT convergence module for each MILS enclave, In some embodiments, the PT tunnel is associated with a common group (e.g., including all nodes within a MILS enclave) or a private group (e.g., including a specific subset of nodes within a MILS enclave and having a private key).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 3A and 3B are diagrammatic illustrations of addressing used by the system of FIG. 1

FIG. 7 is a diagrammatic illustration of exchanging reachability information via plaintext (PT) tunneling between nodes of the system of FIG. 1;

DETAILED DESCRIPTION

Figure 1:
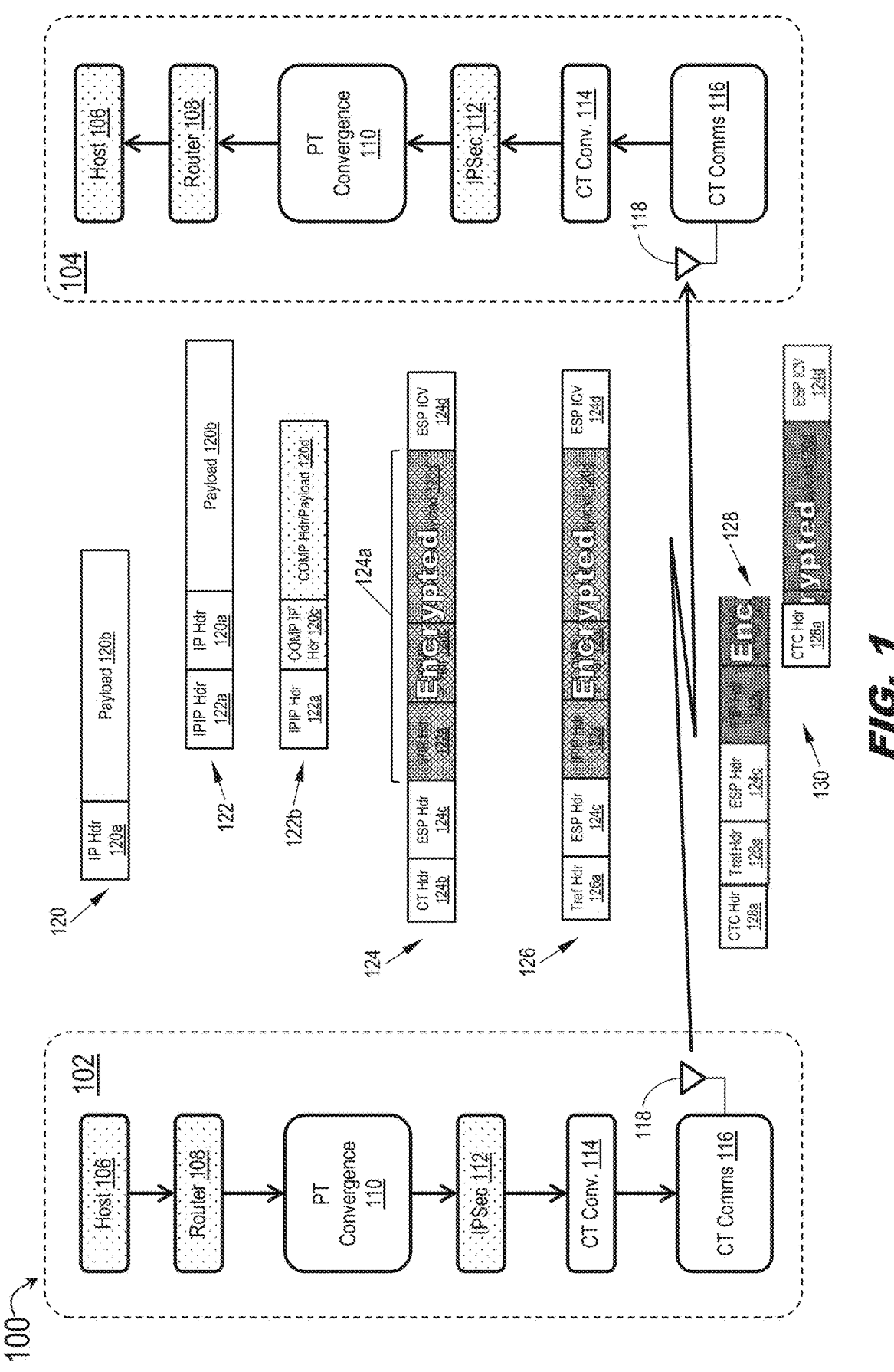
FIG. 1 is a block diagram illustrating a system for internet protocol security (IPSec) and networking for next-generation mobile ad hoc network (MANET) waveforms according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Embodiments of the inventive concepts disclosed herein are directed to combining Second Generation Anti-Jam Tactical UHF Radio for NATO (SATURN) Enhanced Data Rate (SEDR), Warrior Robust Enhanced Network (WREN; e.g., WREN-NB narrowband and WREN-TSM wideband), Soldier Radio Waveform (SRW), and other next-generation MANET waveforms with unmodified IPSec encryption (e.g., High Assurance Internet Protocol Encryptor (HAIPE), Networking and Information Infrastructure (NII) IP Network Encryption Traffic Protection (NINE, NINE-TP)) to achieve low-to-no-over-the-air-overhead autoconfiguration and low-overhead dynamic red-to-black IP address discovery with Multiple Independent Levels of Security (MILS) support. For example, cross-layer information exchange capability comparable to that achieved via bespoke communications security (COMSEC) bypass exchanges via Type I radios and prior tactical MANET waveforms may be achieved via plaintext (PT) (aka Red traffic) and ciphertext (CT) (aka Black traffic) convergence functions on either side of the IPSec encryption combined with Internet Control Message Protocol (IGMP) bypass and waveform-specific Differentiated Services Code Point (DSCP) values. Further, PT/CT convergence and IPSec encryption may be embodied in a standalone external device, allowing MILS encryption and MANET-optimized IP networking with commercial off the shelf (COTS) radios without the need for specialized Type I devices.

Embodiments of the inventive concepts disclosed herein are applicable to commercial and military platforms alike, although the detailed implementations may differ across various commercial or military applications. Further, while general descriptions refer to MANET implementations, embodiments of the inventive concepts disclosed herein are applicable beyond the MANET implementations referenced herein (e.g., satellite systems and other appropriate networks; cabled, wired, and otherwise physically connected networks) and said implementations should not be taken as limiting.

Broadly speaking, embodiments of the inventive concepts disclosed herein are directed to IPSec for next-generation MANET waveforms (including, but not limited to, those noted above). Although this invention specifically targets MANET IP networks, this invention provides a way to efficiently and with low overhead discover red/black addresses to configures SAs and map the IPsec IP packets to PT networking whether over MANET waveforms or other network environments.

For example, under a "SEDR-IPSec" implementation as described in detail below, platform IP networking may be configured independently. For example, each platform may be configured for IPSec convergence functions for plaintext and ciphertext, with a standard addressing template and a standard SA template for IPSec ECUs. Further, a network planner may learn a system address (e.g., 24-bit SEDR system address) for each platform and generate a one-to-one configuration table of system addresses to short addresses. Common keys identified in the configuration table of SAs may be loaded into the IPSec convergence functions as well as the IPSec ECU such that platforms entering the network may exchange secure traffic without the need for IKE. PT convergence functions at each platform perform red address reachability exchanges. Embodiments of this approach may facilitate rapid network entry by providing for dynamic address learning with low overhead. Further, new platforms may enter during a mission associated with an updated table and common key without the need for modification of tables loaded to other platforms.

Referring now to FIG. 1, a mobile ad hoc network (MANET) optimized internet protocol (IP) network 100 is shown. The network 100 may include network nodes 102, 104 (e.g., communication nodes, MANET nodes, platforms).

In embodiments, each node 102, 104 may include hosts 106, routers 108, plaintext (PT) convergence modules 110, IPSec End Cryptographic Units 112 (ECU), ciphertext (CT) convergence modules 114, and CT communications modules 116. For example, CT communications modules 116 may include MANET application programming interfaces (API) and/or radio systems 118 configured for transmission (Tx) and/or reception (Rx) according to one or more next-generation MANET waveforms as described above.

In embodiments, with respect to a transmitting node 102 of the network 100, hosts 106 and/or routers 108 may be configured for transmission and routing of IP packets 120. For example, each IP packet 120 may include an IP header 120a and data payload 120b.

In embodiments, PT convergence modules 110 may encapsulate the IP packet 120 into an encapsulated IP packet 122 (IP-in-IP, IPIP). For example, the encapsulated IP packet 122 may include an outer IP header or IPIP header 122a to indicate (e.g., via Differentiated Services Code Point (DSCP)) whether the IPIP packet is to be ALL-cast (e.g., as opposed to unicast or multicast). In some embodiments, the PT convergence module 110 may statelessly compress (122b) the encapsulated IPIP packet 122 (e.g., compressed IP header 120c, compressed payload 120d). In other embodiments, e.g., if encryption of the IPIP packet 122 would exceed maximum transmission unit (MTU) restrictions, the IPIP packet may be fragmented (not shown).

In embodiments, IPSec ECUs 112 may encrypt the IPIP packet 122 (e.g., via Encapsulating Security Protocol (ESP)-Advanced Encryption Standard (AES)-cipher block chaining (CBC) or like encryption algorithms). The encrypted packet 124 (e.g., IPSec CT packet) may include, in addition to the encrypted IPIP packet 124a, CT header 124b, ESP header 124c, and ESP integrity check value 124d (ICV).

In embodiments, CT convergence modules 114 may statelessly compress out the CT header (114b) from the IPSec CT packet 124, adding to the resulting traffic packet 126 a traffic header 126a and/or RF header metadata (not shown), e.g., source and destination addresses, routing address, requested MANET quality of service (QOS) including priority (e.g., packet priority). For example, the compressed CT header 114b by the CT convergence module 114 may include mapping of DSCP values (e.g., from the IPIP header 122a, as noted above) to QOS.

In embodiments, CT communications modules 116 (e.g., SEDR or like next-gen MANET waveform, radio system 118) may segment the traffic packet 126 into segments 128, 130, each segment including a CT communications header 128a. For example, the CT communications header 128a may include (e.g., in SEDR or other like MANET applications) RF header metadata and segment headers (e.g., for segmented traffic packets 128, 130). In embodiments, the segments 128, 130 may be transmitted (e.g., via SEDR or like MANET waveform) to the receiving node 104 (e.g., and/or other nodes of the network).

In embodiments, with respect to the receiving node 104, the CT communications module 116 and/or radio system 118 may receive the transmitted segments 128, 130 from the transmitting node 102 (e.g., if the traffic packet 126 was segmented) and may reassemble the traffic packet 126 from the received segments.

In embodiments, the IPSec ECU 112 may decrypt the traffic packet 126 into the encapsulated packet 122 (and/or compressed IPIP packet 122b), which the PT convergence module 110 may de-encapsulate (and uncompress the compressed IP header and payload 118c/118d, if necessary), passing the resulting IP packet 120 to the routers and/or hosts 108, 106.

In embodiments, the PT convergence module 110 may uncompress the IPIP header 122a, e.g., based on the traffic header 126a and/or RF header metadata.

In embodiments, a node 102 may be informed which network addresses are reachable via other nodes 104 of the network 100 (e.g., IP gateway nodes serving as gateways to other node clusters) through a combination of static and dynamic address mapping. For example, preconfigured static mapping of IP addresses to each node 102, 104 allows new nodes to learn IP routing without delay upon entering the network 100, and eliminates any over-the-air overhead associated with learning addresses. However, static mapping also requires each node 102, 104 to know all IP hosts and networks and precludes the addition of new hosts or networks after the routing plan is developed. In embodiments, dynamic determination of IP gateways at each node 102, 104

(and, e.g., reactive exchange of routing information between the routers 108 of each node whenever the routing information changes) reduces over-the-air overhead for address discovery as opposed to proactive exchanges. Further, nodes 102, 104 may not need to know or coordinate gateways in advance; the set of hosts 106 or networks reachable by any node may change during the mission.

In embodiments, default unicast and multicast addresses (e.g., ALL-cast, one-hop) may be known to nodes 102, 104, while mission, group, and/or platform specific addresses may be discovered subsequent to network configuration.

In embodiments, the MANET-optimized IP network 100 may incorporate stateless compression of plaintext (PT) packets and ciphertext (CT) headers (e.g., with respect to the compressed IP header 120c and compressed payload 120d of the compressed IPIP packet 122b). If needed, fragmentation (e.g., of the IPIP packet 122, 122b and/or traffic packet 126, as noted above) may be incorporated to avoid extra segment transmissions, e.g., based on poor fragment maximum transmission unit (MTU) sizes as opposed to MANET segment MTUs. In embodiments, mapping of IP packets 120 into MANET packets 126 as described above may further extend to IPv6, non-IP traffic, and other future protocols.

In embodiments, the determination and loading of MANET security associations (SA), e.g., plaintext (PT) and ciphertext (CT) addresses and encryption/decryption keys, may be handled differently with respect to 1) the set of all PT addresses and subnets and 2) the set of PT gateway addresses. With respect to the latter set of PT gateway addresses only, for example, MANET-optimized IPsec ECUs 112 may provide for preconfigured static mapping of SAs with pre-placed keys (PPK; e.g., defined in RFC 4301, available in HAIPE, NINE-TR) at each node 102, 104. Further, preconfigured static mapping may provide for one or more PT addresses for each CT address. This approach eliminates any delay in setting up SAs when new nodes enter the network 100 as well as any over-the-air overhead associated with SA coordination. However, the specific mapping of PT addresses to CT addresses must be known by nodes 102, 104 prior to deployment, and the same IPSec configuration must be loaded to each node. As a consequence, additional platforms may not be added after the configuration is developed.

In embodiments, with respect to the former set of all PT addresses and subnets, MANET-optimized IPSec ECUs 112 may incorporate preconfigured static mapping of security policy databases (SPD) and PPKs with one or more PT addresses to one or more CT addresses. For example, under this approach SAs may be set up dynamically based on the SPDs (e.g., Populated from Packet (PFP)) when IP packets 120 are transmitted or received based on CT addresses.

In embodiments, as an alternative approach with respect to the former set of all PT addresses and subnets, implicit peer enclave prefix discovery (IM-PEPD) may be incorporated. For example, the IPSec ECU 112 may instead provide for implicit mapping between PT and CT addresses, with pairwise internet key exchanges (IKE) as needed. This approach may differ from the prior approach in that the same configuration need not be loaded to all nodes 102, 104, as SAs may be set up dynamically. Further, the dynamic nature of the configuration allows new platforms to be added to the MANET. In some embodiments, a Generic Discovery Server (GDS) and/or Generic Discovery Client (GDC) may be incorporated to discover the mapping between PT and CT addresses.

In embodiments, IPSec source and destination addresses may be mapped to radio system source and destination addresses and/or quality of service (QOS) features.

In embodiments, MANET-optimized IPsec 112 and networking 100 as disclosed herein may be implemented across a variety of protocols including, but not limited to: IPV4, IPV6, tunnel, transport, Encapsulating Security Payload (ESH), Authentication Header (AH) as well as the variety of waveforms outlined above (e.g., WREN, SEDR, other next-gen MANET waveforms) or commercial waveforms such as IEEE 802.11 Wireless Local Area Network (WLAN). Over-the-air formats may include other IPSec approaches still in development or non-IP traffic. In embodiments, the network 100 may include an internet protocol (IP)-based network, a radio frequency (RF) based network, a MANET (e.g., a homogeneous network dedicated to a single network/node/protocol type, or a heterogeneous network combining two or more types of network/node/protocol, e.g., IP, RF, MANET, fiber, optical, and/or cellular.

For example, IP PT addressing modes may default to multicast (e.g., ALL-cast, one hop broadcast) with learned unicast, multicast, and/or unicast-equivalent multicast. In some embodiments, Network Address Translation (NAT) may be supported, as well as multicast for specialized CT communication services, such as reserved capacity.

In embodiments, with respect to some MANET implementations, red-side (e.g., PT convergence 110) control requests may be supported. For example, time slots may be reserved in MANET channel access implementations. In some embodiments, CT communication gateway nodes may indicate their gateway status. These features will be discussed in detail below.

In embodiments, the IPSec ECU 112 may utilize pre-existing IPsec (e.g., NINE-TP encryption) without changes. Further, the network 100 may leverage existing Internet Group Management Protocol (IGMP) bypass and Differentiated Services Code Point (DSCP) for ciphertext (CT) as described in greater detail below.

In embodiments, whether the implemented waveform is SEDR, WREN, or some other next generation MANET waveform, the nodes 102, 104 may incorporate IPsec CT and PT convergence functions 110, 114 (e.g., protocols) on either side of the IPSec ECU 112. For example, the nodes 102, 104 may incorporate CT convergence 114 (CC, CTC; e.g., black networking) on the radio side and PT convergence 110 (PC, PTC: e.g., red networking) on the host side. In some embodiments, multiple IPsec ECUs 112 may be used, e.g., to support Multiple Independent Levels of Security (MILS) layers (e.g., US-classified, US-unclassified, coalition-classified, coalition-unclassified, Sensitive but Unclassified (SBU), Secret and Below (SAB)) for classified or unclassified traffic (as described below). For example, the PT convergence/red networking components 110 may add a second layer of encryption over the existing IPsec 112. In embodiments, PT and CT convergence protocols 110, 114 enable a lower protocol layer (e.g., radio side) to support the communications of a higher protocol layer (e.g., host side). For example, convergence protocols and functions may include: mapping higher protocol layer addresses to lower protocol layer addresses; mapping higher protocol layer quality of service (QOS) definitions into lower protocol layer QOS definitions; segmenting and reassembling higher protocol layer packets to fit into smaller lower protocol layer packets, bundling and unbundling higher protocol layer packets into larger lower protocol layer packets; providing cross-layer information, such as lower protocol layer topology and address reachability information, to higher protocol layers.

In some embodiments, hosts 106 may be remotely located from a MANET platform and communicate therewith via external networks between the hosts and the router 108.

In embodiments, gateway (GW) multicast may be bypassed from PT convergence 110 to CT convergence 114 to request the CT convergence module reserve capacity in CT communications 116, e.g. time slots in a MANET network. Further, capacity requests may be bypassed from PT convergence 110 to CT convergence 114 in order to request MANET capacity reservations; likewise, capacity reservation responses to capacity reservation requests may be bypassed from CT convergence to PT convergence to indicate reservation of capacity.

As noted above, here too SA generation is simplified as the same control bypass multicast SA's may be loaded to all IPSec ECUs 112. This simplifies the IPsec SA generation because the same control bypass multicast SAs can be loaded into all IPsec ECUs. Further, as IPsec multicast group addresses are defined as part of the MANET IPsec standard design, pre-mission planning need only generate the new traffic multicast MILS enclave key.

In embodiments, MANET system addresses (e.g., node address, radio address) of a given node 102, 104 or CT communications module 106, e.g., COTS radio system 118, may be mapped to MANET IPSec for that node. For example, each IPSec ECU 112 may be limited in the number of SA's it can store; accordingly, the IPSec may not be able to store the full 24-bit system address. In embodiments, the maximum number of nodes in the network 100 may be limited by the smallest number of SA's storable by any IPSec ECU 112 participating in the mission.

In embodiments, mission planning may list all MANET waveforms/radio systems 118 and/or CT communications modules 116 expected to be in the network at some point. For example, a configuration table mapping each system address to X (e.g., where X refers to one of N slots in a sys-add-to-X table, as described below) may be loaded to the CT convergence modules 114 of all nodes 102, 104 or platforms expected to join the mission (or that might join the mission). Further, if new platforms subsequently join the network 100, the configuration table may be updated and reloaded; upon receiving the traffic multicast SA common key (e.g., for all nodes 102, 104 within a given security enclave or security level), the new platforms may join in the mission.

For example, when operating with MANET networking waveforms like SEDR, the CT communications module 116 may define a standard IP addressing template to be used by PT and CT convergence modules 110, 114 and a standard Security Association (SA) template loaded to the IPSec ECUs 112. The SA template may reference a named SA key to be filled in later. Similarly, in embodiments a standard IP address per the template may map to a MANET waveform System Address, such that IP address mapping may be determined at startup of the network 100. For example, a SEDR-IPSec planner (which may include, e.g., a node 102, 104) may obtain MANET waveform system addresses of platforms in an area capable of communications via said MANET waveforms, and may create a system mapping configuration table mapping the MANET waveform System Address to the SEDR-IPSec template addresses.

Figure 8:
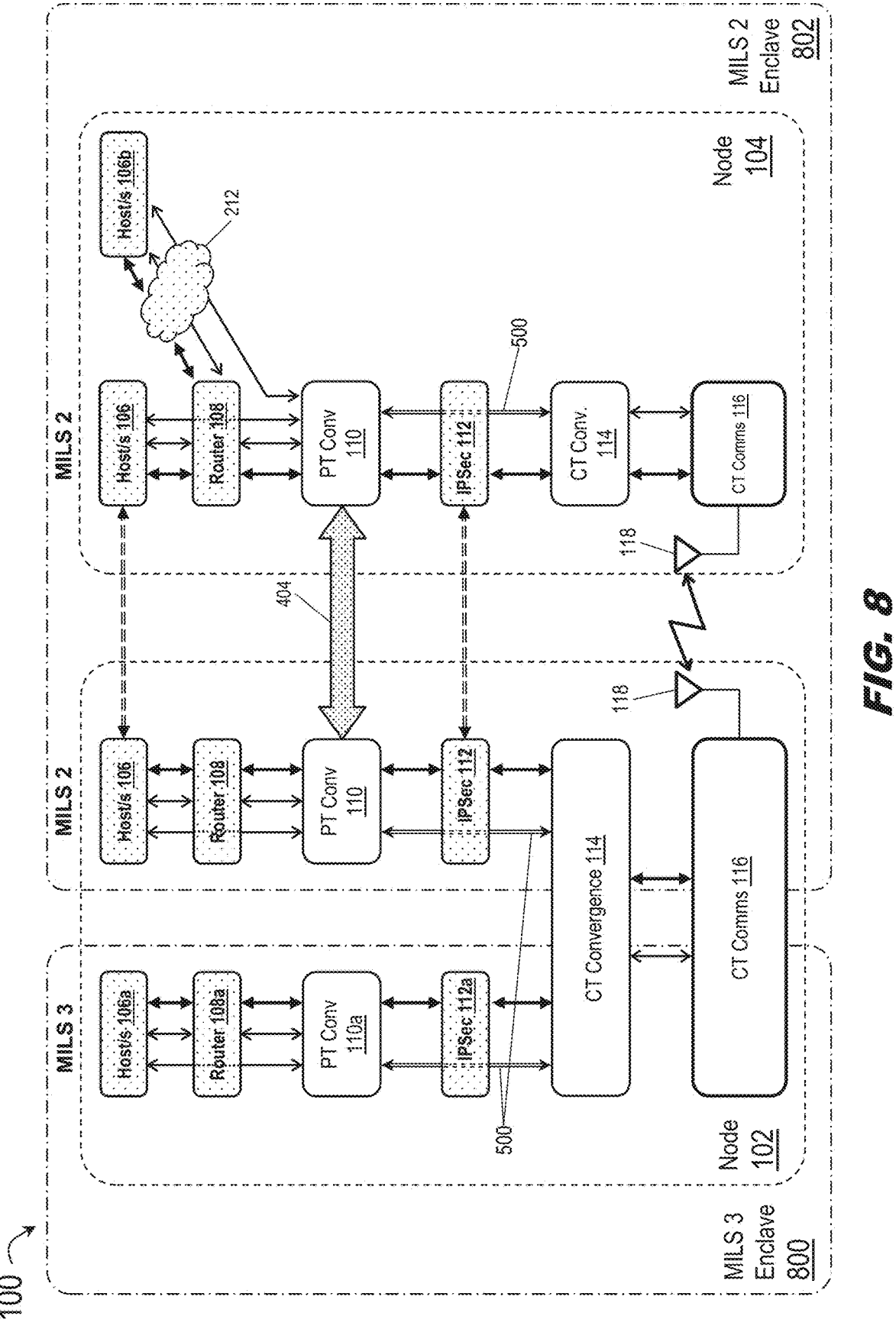
FIG. 8 is a diagrammatic illustration of multiple independent levels of security (MILS) enclaves within the system of FIG. 1 and its components.

In some embodiments, a user system (e.g., node 102, 104, platform) may include one or more host systems 106, which may be directly connected to a PT convergence module 110 for its node (or indirectly connected via one or more routers 108, as discussed below). For example, hosts 106 may communicate with other hosts across the network 100 (but, e.g., within the same MILS enclave, as described in greater detail below) via IPv4 user applications (e.g., or other protocols as applicable). In embodiments, a host 106 may be generally embodied within the same platform, e.g., an aircraft, as its radio system (e.g., CT communications module 116, radio system 118). However, hosts 106 external to a node 102, 104 or platform with a radio system 118 may communicate across the MILS enclave via external networks (e.g., as shown by FIG. 8 and discussed below).

In embodiments, each host 106 may know which common groups and/or private groups (e.g., with respect to MILS enclaves and levels, as shown below by FIG. 8) the host will operate, and may provide this information to the PT convergence module 110. For example, host addresses may map to a particular group, so any host 106 belonging to more than one common or private group may have a different address mapped to each group. Further, hosts 106 may know IPSec standard DAC and D1H addresses for all-host or one-hop multicasting within the network 100, and/or PRE (preconfigured addressed), which the host may also share with the PT convergence module 110 (and which may include optional descriptive information for sharing with other hosts). In embodiments, hosts 106 may learn which host addresses and/or multicast groups are reachable via the network 100, and/or any associated descriptive information, via the PT convergence module 110. In embodiments, hosts 106 may join (e.g., via IGMP) multicast groups in order to receive communications traffic therefrom. In some embodiments, a host 106 may request the PT convergence module 110 to notify the radio system 118 or CT communications module 116 that its node 102 is a gateway node (e.g., via which other nodes 104 may be reached, with respect to a particular MILS enclave). Further, the host 106 may request the PT convergence module 110 to forward a request to the radio system 118 or CT communications module 116 to reserve capacity, and receive a response indicating the reserved capacity. In some embodiments, the host 106 may request Network Address Translation (NAT) from the PT convergence module 110.

As noted above, in some embodiments hosts 106 may be indirectly (rather than directly, as discussed above) connected to a PT convergence module 110 via routers 108. For example, routers 108 may route host communications traffic to other hosts within the same MILS enclave (e.g., via MANET) or to other off-platform hosts via external networks.

In embodiments, routers 108 may inform the PT convergence module 110 (e.g., via Dynamic Link Exchange Protocol (DLEP)) which IP subnets the router has been configured to advertise, e.g., based on limits and/or requirements for hosts 106 registering directly with their respective PT convergence modules. Similarly, routers 108 may learn from the PT convergence module 110, e.g., via DLEP, which IP addresses (e.g., other nodes 104) are reachable through the PT convergence module via the network 100. Further, Internet Group Management Protocol (IGMP) may be supported either from the host 106 or from the PT convergence module 110.

In embodiments, the PT convergence module 110 may forward traffic between the host 106 (or router 108) and the IPSec ECUs 112 within its node 102, 104. For example, the PT convergence module 110 for a node 102 may learn (e.g., via message exchange with its host 106 and/or other hosts) which addresses (e.g., CT or destination addresses for peer nodes 104) are reachable via its own node (and, e.g., with which common and/or private groups said addresses are associated). As noted above, the PT convergence module 110 may learn which subnets are reachable via its node 102 (e.g., subnets assumed to be common-group), and may inform the router 108 which addresses are reachable via other nodes 104, e.g., via DLEP exchange with the router. In embodiments, the PT convergence module 110 may inform its host 106 which unicast and/or multicast addresses in a host's common or private group are reachable.

In embodiments, the PT convergence module 110 may converge output (outbound) traffic according to one or more ciphertext (CT) capabilities associated with the CT communications module 116. For example, the PT convergence module 110 of a given node 102 may map output traffic (e.g., associated with an IP address or a system address) to a CT destination address (e.g., of a destination or receiving node 104 to which the output traffic may be transmitted). Further, the output traffic may be mapped to a quality of service (QOS) priority, e.g., packet priority. Further still, the output traffic (e.g., IPIP packet 122) may be compressed (e.g., compressed IPIP packet 122b) or fragmented into two fragment packets (not shown), e.g., if the size of an encrypted packet 124 based on the IPIP packet 122 would exceed maximum transmission unit (MTU) permitted by the CT communication module 116.

In embodiments, the IP Sec ECU 112 may provide for cross-layer exchange of information (e.g., as shown below by FIG. 5) between the PT convergence module 110 and the CT convergence module 114, bypassing the IPSec ECU 112 (e.g., via IGMP bypass). For example, the PT convergence module 110 may learn the radio system address for its node radio system 118 (e.g., for unicast-equivalent multicast (UEM-X)) via IGMP bypass.

In embodiments, the PT convergence module 110 of a node 102 may exchange information with other PT convergence modules associated with other nodes 104. For example, the PT convergence module 110 of node 102 may learn which dynamic IP addresses are reachable via the node 104 by exchanging address information with its PT convergence module (and/or, e.g., other PT convergence modules), e.g., via PT-Convergence All-Cast (PC-AC) to all PT convergence modules in the network 100, or via unicast (e.g., UEM) to a specific PT convergence module of a specific node. In some embodiments, the PT convergence module 110 may engage a tunnel mode whereby user traffic (e.g., DAC, D1H, UEM-X, PRE IP traffic inside IP (e.g., RFC 1853, RCE 2004)) is tunneled by mapping host source and destination addresses to the destination PT convergence module's DAC, D1H, or UEM-X addresses; further, the source PT convergence module 110 may set appropriate DSCP values with respect to the IPSec ECU 112 to indicate whether the common or private group associated with the tunneled traffic (e.g., ALT-GRE, RFC 2890) provides for alternative encapsulation requiring extra bytes. In some embodiments, the PT convergence module 110 may not tunnel DAC or UEM-X dynamic address information inside IP, but may instead set the DSCP value to indicate traffic between PT convergence modules of two different nodes 102, 104.

In some embodiments (e.g., if possible), the PT convergence module 110 may compress PT packets (122b) before passing said packets to the IPSec ECU 112 (e.g., via IPCOMP (RFC 3173), DEFLATE (RFC 1951), or other appropriate compression algorithms) to minimize the need for fragmentation by either the PT convergence module (e.g., after IPIP encapsulation) or by the IPSec ECU (e.g., after encryption)). If, for example, the size of an IPIP encapsulation packet 122 exceeds a maximum transmission unit (MTU) size for transmissions between the PT convergence module 110 and IPSec ECU 112, or if a predicted size of an encrypted (IPSec CT) packet 124 exceeds an MTU for transmissions between the IPSec ECU 112 and CT convergence module 114, the PT convergence module may fragment the IPIP encapsulation packet 122 into fragments, e.g., two fragments sized to minimize the total number of MANET segments 128, 130 transmitted by the MANET waveform 116.

In embodiments, the PT convergence module 110 may inform the node radio system 118 (e.g., via IGMP bypass to the CT convergence module 114) of a node radio status, e.g., gateway node status. For example, if the node 102 is a gateway node, the CT communications module 116 may reserve additional MANET transmission slots or otherwise reserve traffic capacity. In some embodiments, gateway node status may apply only within select MILS enclaves, e.g., MILS 0 enclaves. Similarly, the PT convergence module 110 may request the radio system 118 reserve capacity for streaming traffic (and receive a response indicating how much capacity or how many slots were reserved) via IGMP bypass exchange with the CT convergence module 114.

In embodiments, the IPSec ECUs 112 of the node 102 may encrypt outbound IP traffic (e.g., encapsulated IP packets 122) exchanged with other MANET nodes 104 (e.g., and may decrypt inbound traffic (e.g., encrypted IPSec CT packets 124 received from other nodes). In some embodiments, the IPSec ECUs 112 may incorporate Encapsulating Security Payload (ESP) rather than Authentication Header (AH) or ESP+AH protocols to reduce overhead.

In some embodiments, the IPSec ECUs 112 may incorporate tunnel mode or transport mode, as shown and discussed below, with IPIP encapsulation by the PT convergence module 110, to support host 106-router 108 (or router-router) exchanges.

In embodiments, the IPSec ECUs 112 may encrypt, decrypt, or discard traffic depending on its Security Association (SA). For example, a node 102 associated with a particular MILS enclave may have a common set of multicast SA's and a single PPK for all DAC, D1H, and UEM multicast groups (e.g., common groups) between IPSec ECUs 112 within that MILS enclave. Further, if the associated host 106 is a member of any private groups, the IPSec ECUs 112 may also have a set of multicast SA's and single PPL for private DAC, D1H, and UEM multicast groups. In some embodiments, a MILS 0 enclave (e.g., and/or other MILS level enclaves) IPSec ECU 112 may have a common set of multicast SA's without a PPK (e.g., allowing for IGMP bypass but not for IP traffic) to support cross-layer control and information exchanges between the PT convergence module 110 and CT convergence module 114.

In embodiments, if multiple MILS layers are supported by a node 102, the node 102 may have a unique IPSec ECU 112 for each supported MILS layer, e.g., wherein all SA sets and/or PPK's at each IPSec ECU are exclusive to the supported MILS layer (e.g., as shown below by FIG. 8).

In embodiments, as noted above, the IPSec ECU 112 may operate IGMP in bypass mode (e.g., in some embodiments, CT-DHCP or ICMP) to allow cross-layer exchanges between the PT and CT convergence modules 110, 114. For example, the CT convergence module 114 may provide the PT convergence module 110 via IGMP with cross-layer information including quality of service (QOS) information (e.g., packet priority).

In embodiments, the CT convergence module 114 may learn the radio system address for its node radio system 118 (e.g., or CT communications module 116) and determine a node address for its node 102, e.g., based on a system-address-to-node (e.g., Sys-Add-To-X) configuration table. For example, the CT convergence module 114 may inform the PT convergence module 110 of the node address (e.g., for UEM-X operations by the PT convergence module, as noted above), e.g., via cross-layer IGMP bypass. In some embodiments, the CT convergence module 114 may inform the IPSec ECU 112 of its CT interface address (e.g., for the interface between the IPSec ECU and CT convergence module).

In embodiments, the CT convergence module 114 may receive encrypted outbound traffic (e.g., IPSec CT/encrypted packet 124) from the IPSec ECU 112. If, for example, the destination of a traffic packet 126 is reachable via a receiving MANET node 104, the CT convergence module 114 may statelessly compress out the CT IP header 124*b* and create RF header metadata therefrom, construct a traffic header 126*a* (e.g., in addition to CT communications headers 128*a*) and forward the traffic packet 126 (or, e.g., segments 128, 130 thereof) to the CT communications module 116. Further, packets whose destinations are not reachable may be dropped or returned, e.g., via ICMP. In embodiments, the CT convergence module 114 may receive inbound traffic (e.g., traffic packets 126 or segments 128, 130 thereof) from the CT communications module 116. For example, for each inbound traffic packet 126 the CT convergence module may statelessly build a CT IP header 124*b* (e.g., based on the MANET CT communications headers 128*a* and traffic headers 126*a*) and forward the resulting IPSec CT packet 124 to the IPSec ECU 112 for decryption.

In embodiments, the CT convergence module 114 may receive (e.g., via cross-layer IGMP bypass with the PT convergence module 110) requests to indicate a node status of its associated node 102, e.g., a gateway node requiring H slots (or some other amount of capacity) allocated by the CT communications module 116. Further, the CT convergence module 114 may receive requests (e.g., from the PT convergence module 110 via cross-layer IGMP bypass) to reserve capacity for streaming traffic. Accordingly, the CT convergence module 114 may learn this information from the CT communications module 116 or radio system 118 and inform the PT convergence module 110 how much capacity was reserved.

Figures 2A, 2B:
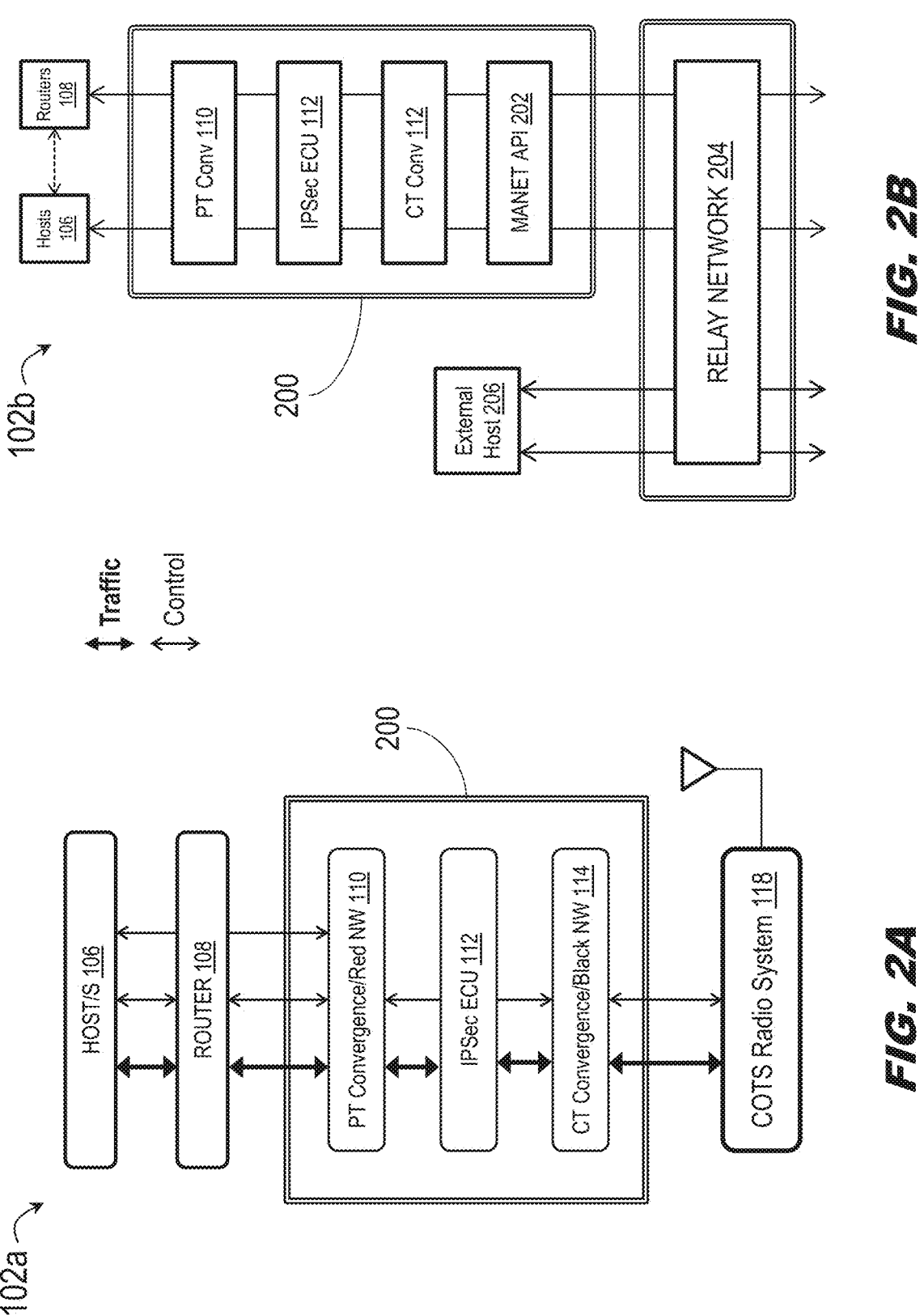
FIGS. 2A and 2B are diagrammatic illustrations of the system of FIG. 1 implemented as a standalone external MANET controller device.

In some embodiments (e.g., for military-grade WREN narrowband or wideband waveforms; see, e.g., FIG. 2A), the CT convergence module 114 may provide additional layers of encryption above and beyond that provided by the IPSec ECU 112.

In embodiments, the CT communications module 116 (e.g., SEDR, WREN, or other like appropriate waveform utilized by the radio system 118, MANET, or embodying network 100) may manage channel access and network routing protocols and configure a system address. For example, the CT communications module 116 may pass the system address to the CT convergence module 114 as noted above.

In embodiments, the CT communications module 116 may receive from the CT convergence module 114 traffic packets 126 for transmission, and may segment (if necessary) the received packets into MANET or other waveform appropriate segments 128, 130 for transmission over the air. Further, the CT communications module 116 may fill in the CT communications headers 128*a* for each segment 128, 130 with next-hop parameters based on RF header metadata generated by, and received from, the CT convergence module 114.

In embodiments, the CT communications module 116 of the node 102 may receive over the air (e.g., via radio system 118) segments 128, 130 from other CT communications modules (e.g., of the node 104) throughout the network 100, reassembling the received segments into a complete traffic packet 126. For example, if the completed traffic packet 126 passes CRC check and the destination node 102 is correct, the completed traffic packet may be forwarded to the CT convergence module 114.

In embodiments, the (e.g., via radio system 118) may receive from the CT convergence module 114 (and may process) requests for gateway node status, or requests to reserve capacity for streaming traffic, as noted above.

In some embodiments, one or more of the PT convergence module 110, the CT convergence module 114, or the CT communications module 116 (e.g., WREN and other like MANET waveforms) may provide additional levels of encryption and decryption above and beyond those provided by the IPSec ECUs 112. For example, the PT convergence module 110 may provide pre-encryption of output traffic (e.g., IPIP packets 122) prior to encryption by the IPSec ECU 112, and post-decryption of input traffic subsequent to decryption by the IPSec ECU. Similarly, one or both of the CT convergence module 114 and MANET waveform/radio system 118 may provide additional or post-encryption of output traffic (e.g., traffic packets 126) subsequent to encryption by the IPSec ECU 112, and pre-decryption of input traffic (e.g., traffic packets or segments 128, 130 thereof) prior to decryption by the IPSec ECU.

Figure 2C:
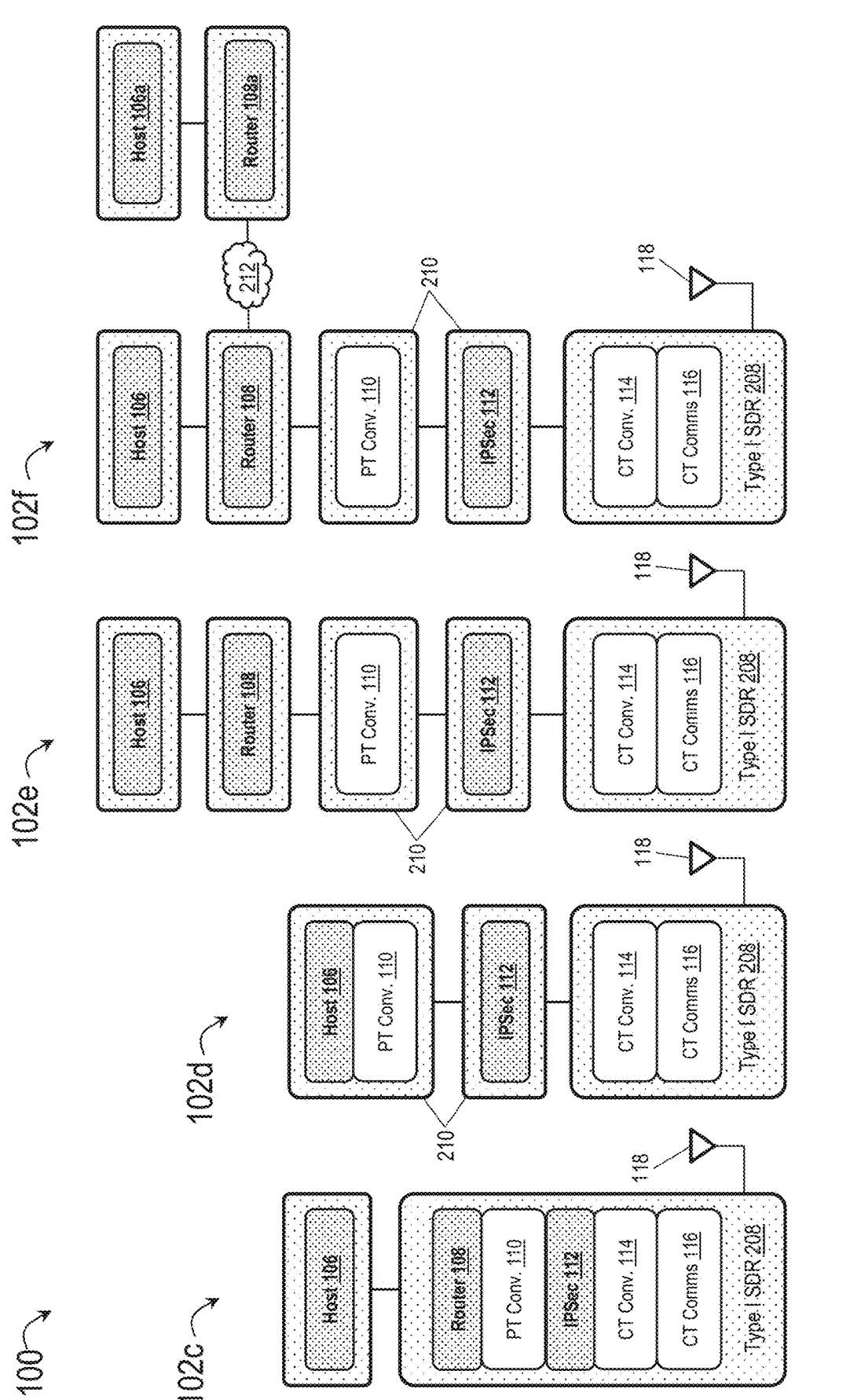
FIG. 2C is a diagrammatic illustration of various implementations of the system of FIG. 1 and/or the controller devices of FIGS. 2A and 2B.

Referring generally to FIGS. 2A through 2C, implementations of the components of a node 102, 104 of the network 100 (e.g., hosts 106, routers 108, PT convergence modules 110, IPSec ECUs 112, CT convergence modules 114, CT communications modules 116, and/or radio systems 118) are shown.

In embodiments, referring in particular to FIG. 2A, a MANET node 102a (e.g., platform) may be implemented and may function similarly to the nodes 102, 104 of FIG. 1, except that the MANET node 102a may incorporate PT convergence module 110 (e.g., red networking), IPSec ECU 112, and CT convergence module 114 (e.g., black networking) into an external (e.g., standalone) MANET controller 200. For example, the external MANET controller 200 may plug into or otherwise physically connect to an unclassified commercial off-the-shelf (COTS) software defined radio (SDR) or like radio system 118 (e.g., Sensitive but Unclassified-Encrypted (SBU-E)) and provide MANET networking and IPsec interoperability as described above for the desired commercial or military waveform/s. Similarly, the external MANET controller 200 may connect, physically or wirelessly, to hosts 106 directly or via routers 108.

In some embodiments, the external MANET controller 200 may alternatively be implemented via a software module embedded in a host 106 or router 108 to enable support of MANET classified/unclassified/commercial/military traffic.

In embodiments, referring in particular to FIG. 2B, a MANET node 102b and external MANET controller 200a may be implemented and may function similarly to the nodes 102, 102a and/or external MANET controller 200 of FIGS. 1 and 2A, except that the MANET node 102b may additionally include within the external MANET controller 200a MANET application programming interfaces 202 (API) or other appropriate CT communications modules (116, FIG. 1). For example, the external MANET controller 200a may connect to a relay network 204 and thereby communicate with external hosts 206.

Referring in particular to FIG. 2C, additional implementations 102c-102f of the MANET node 102, 102a-102b for SEDR or any appropriate MANET waveforms are shown. In embodiments, the MANET platform 102c (e.g., MANET node) may incorporate routers 108, PT and CT convergence modules 110, 114, IPSec ECU 112 (e.g., NINE), and CT communications modules 116 for MANET waveforms in a Type I software defined radio 208 (SDR) or equivalent radio system with embedded cryptography as well as red and black networking, connecting to a host system 106 via routers 108 incorporated into the SDR. Similarly, the MANET platforms/nodes 102d, 102e, 102f may incorporate CT convergence 114 and communications modules 116 for MANET waveforms into the Type I SDR 208 embodiments, while IPSec ECUs 112 and PT convergence 110 (and/or hosts 106 and routers 108) may be incorporated into physically separate but connectible (e.g., plug-in) standalone devices 210 or components. In some embodiments, routers 108 may connect the Type I SDR 208 and other MANET components embedded in standalone devices 210 to additional hosts 106a and routers 108a via external networks 212.

Referring to FIGS. 3A and 3B generally, in embodiments the MANET nodes 102, 104 of FIG. 1 may be associated with a tunnel mode. For example, referring also to FIG. 1, PT convergence modules (110, FIG. 1) associated with a particular node 102 of the MANET 100 may tunnel to other PT convergence modules (of another MANET node 104, e.g., via Unicast Equivalent Multicast (UEM)). Similarly, CT convergence modules (114, FIG. 1) may likewise tunnel to other CT convergence modules in other nodes.

Referring in particular to FIG. 3A, the CT communications module (116, FIG. 1) configured for SEDR or any like appropriate MANET waveforms may map PT-tunnel and CT-tunnel addresses to system addresses associated with MANET waveforms via a sys-add-to-X table 300 using SEDR as an example. For example, the sys-add-to-X table 300 of N entries (e.g., where N is a positive integer corresponding to the number of platforms in a given theater capable or configurable for communications via MANET waveforms) may be created by obtaining a list of system addresses to be used in upcoming missions. In embodiments, the sys-add-to-X table 300 may include a version number to track when nodes 102, 104 must update to a new version.

In embodiments, the sys-add-to-X table 300a may incorporate changes to the sys-add-to-X table 300 when, for example, the platform (e.g., node 102, 104; FIG. 1) having system address 901 and occupying slot 302 (N=1) may leave the theater associated with the MANET 100 (e.g., within which the MANET operates). Further, a new platform having system address 405 may enter the MANET 100 and may be entered in an empty slot 304 (N=4). However, if no sys-add-to-X mapping of a platform changes, the version of the current sys-add-to-X table 300, 300a may similarly remain constant and existing sys-add-to-X tables need not be updated at other nodes 102, 104 in the network 100.

In embodiments, the sys-add-to-X table 300b may represent a new version of the sys-add-to-X table 300, 300a. For example, the platform having system address 361 (at slot 306, N=2) may be replaced by a platform having system address 955. As the mapping of system address 361 to slot 306 changes system addresses (as opposed to a new platform being mapped to an empty slot 304, as shown by the sys-add-to-X table 300a), the version of the sys-add-to-X table 300*b* may likewise increment (e.g., from version 2 to version 3). In embodiments, when the sys-add-to-X table 300, 300*a* is updated to a new version 300*b* for a node 102, sys-add-to-X tables must be updated across other nodes 104 (e.g., by their CT convergence modules 114) in the network 100.

Referring now to FIG. 3B, a multicast addressing table 308 is shown.

In embodiments, the PT convergence modules (110, FIG. 1), IPSec ECUs (112, FIG. 1), and CT convergence modules (114, FIG. 1) of a node (102, FIG. 1) or platform configured for SEDR or other appropriate MANET waveform operations in the network (100, FIG. 1) may be configured to use multicast addressing exclusively, simplifying Security Associations (SA) for the IPSec ECUs. For example, given the N-slot sys-add-to-X tables 300, 300*a*-300*b* of FIG. 3A, only a single SA per multicast group (e.g., N+2) may be required. In embodiments, the IPSec ECU 112 (and optionally the PT and CT convergence modules 110, 114) may load a standard SA list to all platforms 102, 104 referencing a named common key (e.g., common to any available MILS levels). Accordingly, only the referenced named common key need be distributed for each new mission.

In embodiments, a node 102 may default all-cast (DAC), or multicast to all known nodes 104 (e.g., SEDR-configured nodes, if the network is configured for SEDR communications) within the MANET 100. Alternatively, the node 102 may default one-hop (D1H) or multicast only to those configured nodes 104 exactly one RF hop away from the node. Finally, the node 102 may instead unicast-equivalent multicast (UEM-X, where the integer X<N indicates a slot {0, 1 . . . N–2, N–1} of the sys-add-to-X table 300, 300*a*-300*b*) to a multicast group consisting of the single node 104 at slot X (hence, a multicast equivalent to a unicast). in embodiments, UEM-X provides a way to address PT unicast packets to individual CT nodes using multicast addresses to which only the desired (peer) node X executes an IGMP join (e.g., via the peer CT convergence module 114 at the desired/peer node X. For example, black to red mapping can be discovered via cross layer exchanges between PT and CT convergence modules 110, 114 using IGMP bypass implemented by the IPSec ECU 112, as described below.

Figures 4A, 4B:
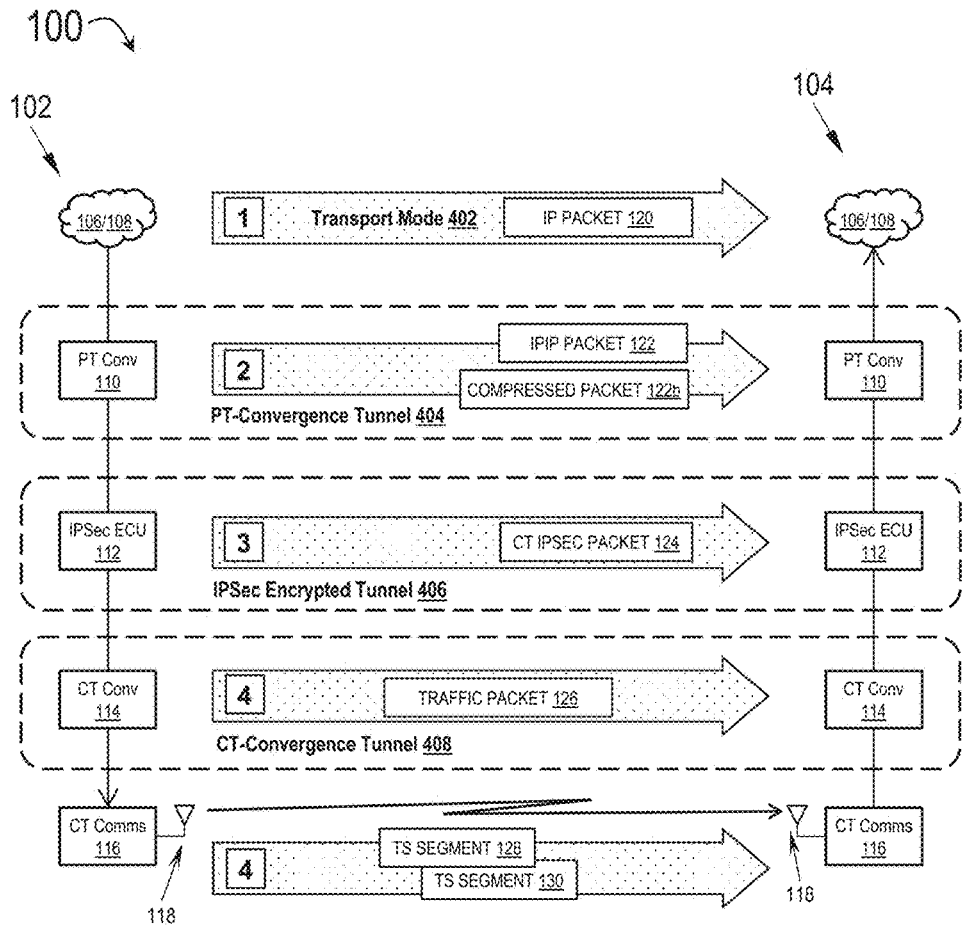
FIGS. 4A and 4B are diagrammatic illustrations of the system of FIG. 1 implemented in tunnel mode.

In embodiments, referring to FIGS. 4A and 4B generally, components of the MANET nodes 102, 104 of the MANET 100 may be associated with IPSec tunnel and/or transport modes. For example, referring in particular to FIG. 4A, host 106-to-host, host-to-router 108, and/or router-to-router exchanges of IP packets 120 may utilize transport mode 402 (e.g., to reduce overhead with RFC 3884). Further, PT convergence modules 110 and CT convergence modules 114 of a given MANET node 102 or platform may exchange information with counterpart PT and CT convergence modules of other MANET nodes 104, e.g., via PT convergence tunnel 404 or CT convergence tunnel 408. In some embodiments, the MANET 100 may enable encrypted tunnels 406 between the IPSec ECUs 112. Further, whether IPsec Tunnel (406) or Transport mode (402) is used, the IPsec ECU 112 may provide a secure end-to-end communications path between the nodes 102 and 104.

In embodiments, at startup/configuration of the MANET 100 (e.g., or a mission thereof), the PT convergence modules 110 of each MANET node 102, 104 may learn any addresses reachable from their associated node or platform. For example, when a node 102 enters the MANET 100, its PT convergence module 110 may exchange its learned addresses (e.g., its sys-add-to-X table (300, 300*a*-300*b*, FIG.

3A)) with counterpart PT convergence modules of other nodes 104 of the MANET. Similarly, the PT convergence module 110 may learn how many RF hops separate its node 102 and the PT convergence modules of other nodes 104.

Referring also to FIG. 4B, when the PT convergence module 110 of the node 102 has exchanged learned system addresses with the PT convergence modules of other nodes 104 of the MANET 100, the PT convergence module 110 may route packets (e.g., encapsulated/IPIP packets 122 (and/or compressed IPIP packets 122*b*), encrypted/IPSec CT packets 124, traffic packets 126 and/or segments 128, 130 thereof) according to the table 408 (e.g., for transmission via UEM-X, DAC, or D1H).

In embodiments, with respect to PT convergence tunnels 404, the PT convergence module 110 may statelessly compress (120*c*, FIG. 1) the original IP header (120*a*, FIG. 1). For example, if a user destination (as shown by table 408) is default all-case (DAC) or default one-hop (D1H), the IP header 120 may be compressed to 5 bytes. Similarly, if the user destination is multicast or user-defined unicast (e.g., UEM-X), the IP header 120 may be compressed to 9 bytes. Further, if the PT convergence module 110 was the source of the packet, the IP header 120 may be compressed to zero bytes for control traffic updates between PT convergence modules 110 of the nodes 102, 104 as described below with respect to FIG. 7.

In embodiments, the PT convergence module 110 may additionally or alternatively statelessly compress (120*d*) the inner packet (e.g., IP data payload 120*b*). Further, to avoid adverse mismatches with MANET segment sizes (e.g., maximum transmission units (MTU)) that may require additional segmenting or fragmenting of packets by the IPSec ECU 112 the PT convergence module 110 may fragment the IPIP packet 122 or compressed IPIP packet 122*b*. Similarly, the PT convergence module 110 may fragment the IPIP packet 122 if doing so presents a more efficient alternative to downstream segmentation of the IPIP packet (e.g., by the IPSec ECU 112, by the CT convergence module 114, or by the CT communications module 116). For example, the PT convergence module 110 may be aware of maximum transmission unit (MTU) restrictions imposed by the CT communications module 116. Further, the PT convergence module 110 may be able to fragment the IPIP packet 122 into two fragments although (due to MTU restrictions) the CT communications module 116 would otherwise be required to segment the IPIP packet into three segments because of the increased size of the IPsec encrypted packet 124 without upstream PT fragmentation. Accordingly, the PT convergence module 110 may reduce the associated overhead by fragmenting the IPIP packet 122 upstream from CT communications (e.g., the resulting fragments being separately encrypted, transmitted, received, and ultimately reassembled by the peer PT convergence module at the receiving/peer node 104.

In embodiments, with respect to CT convergence tunnels 408, the CT convergence module 114 may statelessly compress the CT header (124*b*, FIG. 1) of an encrypted IPSec CT packet 124 into MANET RF metadata appended to the traffic packet (126, FIG. 1). For example, MANET RF metadata may indicate, in addition to source and destination addresses, various quality of service status flags (e.g., all-cast, forward with data error, no retransmission for SEDR waveform). Further, as the MANET waveform itself may be ambiguous with respect to all-cast vs. single-radio (e.g., unicast, UEM-X) status, the traffic header 126*a* may need to indicate the destination status accordingly.

Figure 5:
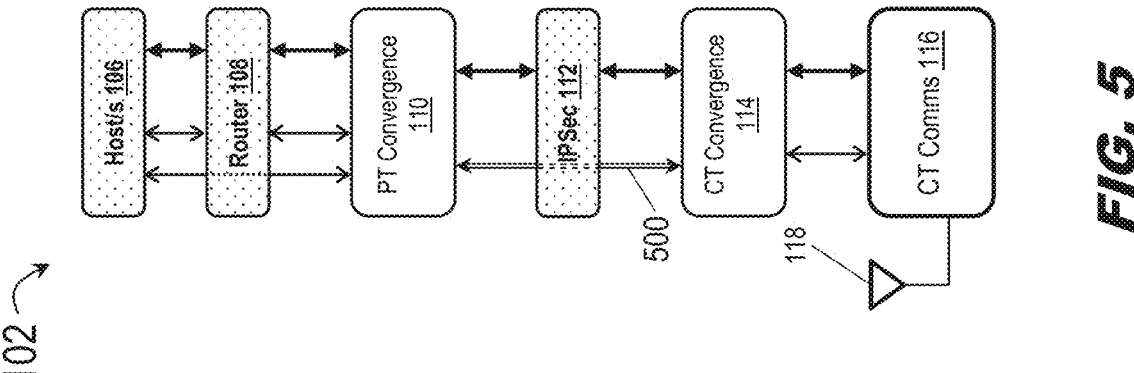
FIG. 5 is a diagrammatic illustration of cross layer coordination by the system of FIG. 1.

Referring now to FIG. 5, the node 102 of the network (100, FIG. 1) is shown.

In some embodiments, control bypass multicast groups may be used for exchanges of cross-layer information and control between PT convergence modules 110 and CT convergence modules 114 of a given node 102, 104. For example, control bypass multicast group SA's may define PT and CT multicast group addresses but without keys; accordingly, the group addresses may be used for IGMP join-and-leave bypass but not for communications traffic. My-X multicast, for example, may bypass from CT convergence module 114 to PT convergence module 110, e.g., to identify a PT-Conv-X (e.g., a PT convergence module from another node) for use in UEM-X. Similarly, 1H-X multicast may bypass from CT convergence module 114 to PT convergence module 110 to notify the PT convergence module (e.g., of a node 102) which other PT convergence modules (e.g., of other nodes 104) are one MANET radio hop away (note, for example, that a PT-Conv-X may be any number of hops away and that the PT convergence module may also be notified of this).

In embodiments, the IPSec ECU 112 may provide cross-layer information exchanges 500 between the PT and CT convergence modules 110, 114 (e.g., comparable to bespoke communications security (COMSEC) provided by Type I SDRs for prior military waveforms). For example, the IPSec ECU 112 (e.g., NINE-TR) may be operated in an Internet Group Management Protocol (IGMP) bypass mode allowing IGMP packets to be exchanged between the PT and CT convergence modules 110, 114, bypassing through the IPSec ECU.

In embodiments, IGMP packets sent and received via cross-layer exchange 500 may include an IGMP address. For example, the IGMP address may indicate both the message type and the message content, i.e., the information being bypassed between the PT and CT convergence modules 110, 114. Examples of IGMP addresses may include, but are not limited to:

an-X packet (e.g., UEM-X, having an IGMP address 239.251.x1.x2), whereby the CT convergence module 114 informs the PT convergence module 110 of the user-defined address X of the node 102 or platform. For example, X may refer to the slot number of the node 102 in the sys-add-to-X tables (300, 300a-300b; FIG. 3A), where X<N, the number of potential platforms configured for MANET operations in the current theater. In some embodiments, the CT convergence module 114 may use-X packets to inform the PT convergence module 110 of other PT convergence modules of other nodes 104 having user-defined addresses;

a 1H-X packet (e.g., one hop-X, having an IGMP address 238.250.x1.x2), whereby the CT convergence module 114 informs the PT convergence module 110 if a platform having user-defined address X is one hop, or at least two hops, away from the node 102;

a MANET-GW packet (e.g., MANET Gateway, having an IGMP address 239.255.255.171), whereby the PT convergence module 110 informs the CT convergence module 114 of the gateway node status of the node 102 (e.g., as a gateway node to one or more node clusters reachable via the node 102), e.g., so the MANET waveform (116, 118) can reserve a gateway hop slot similarly to SEDR operations;

a PT-Conv-TX packet (e.g., having an IGMP address 239.255.255.172), via which the PT convergence mod-ule 110 informs the CT convergence module 114 that the PT convergence module has reachability information to transmit.

In embodiments, cross-layer information exchanged 500 between the PT convergence module 110 and CT convergence module 114 may further include information about MILS enclaves and/or security levels as discussed below (see, e.g., FIG. 8).

Figure 6:
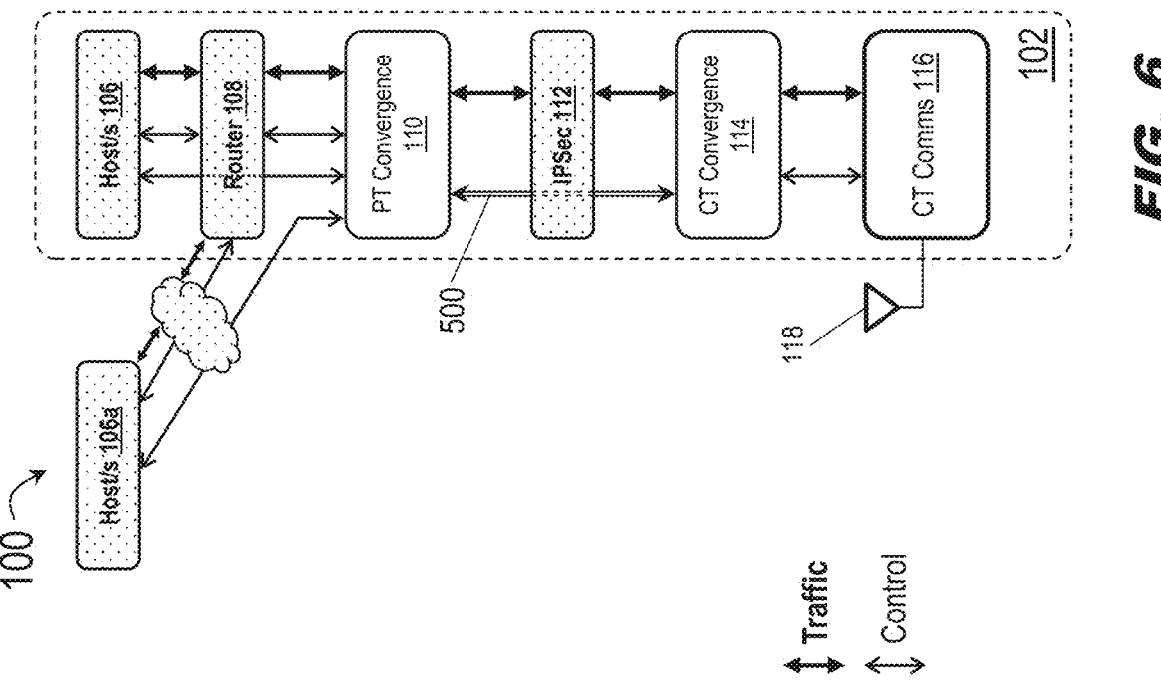
FIG. 6 is a diagrammatic illustration of plaintext (PT) address learning within the system of FIG. 1.

Referring now to FIG. 6, the MANET 100 and node 102 thereof are shown.

In embodiments, the PT convergence module 110 and host 106 (e.g., along with other hosts 106a with which the PT convergence module or node 102 may be in communication via external networks 212) may exchange reachable PT address messages (e.g., reachability information). For example, hosts 106, 106a may inform the PT convergence module 110 (of node 102) of the hosts'/32 unicast and/or multicast addresses (which may include additional optional descriptive information with respect to these addresses, e.g., an identifier of a vehicle or platform within which the node is embodied). Similarly, the PT convergence module 110 may inform the hosts 106, 106a which addresses (e.g., counterpart PT convergence modules associated with other nodes 104 of the MANET 100) are reachable.

In some embodiments, routers 108 and PT convergence modules 110 similarly exchange Dynamic Link Exchange Protocol (DLEP) messages. For example, routers 108 may inform the PT convergence module 110 of IP subnets reachable via the node 102 or platform. Similarly, the PT convergence module 110 may inform the router 108 of addresses (e.g., /32 and IP subnets) reachable through other nodes 104 or platforms.

Referring to FIG. 7, the MANET 100 and nodes 102, 104 are shown.

In embodiments, PT convergence modules 110 (e.g., associated with nodes 102, 104) may exchange address reachability information with each other, e.g., when either node 102, 104 enters the MANET 100 or a theater where the MANET is operating according to an ongoing mission. For example, reachability information may be exchanged via user datagram protocol (UDP) or like packets sent via PT convergence tunnel 404, directly between counterpart PT convergence modules 110. In some embodiments, reachability information may include additional optional descriptive information. It may be noted that the PT convergence tunnel 404 is above end to end IPsec secure communications (e.g., for exchange of IPIP packets 122).

In embodiments, PT convergence modules 110 may transmit address reachability messages only, e.g., if at least one host 106 served by the PT convergence module has indicated transmission or reception to destinations via other than DAC or D1H. Additionally or alternatively, address reachability messages may be transmitted only if routers 108 served by the PT convergence module 110 indicate external IP subnets.

In some embodiments, the PT convergence module 110 for a node 102 may inform the CT convergence module 114 for that node that the PT convergence module has reachability information to transmit (e.g., via the PT tunnel 404). For example, the PT convergence module 110 may notify the CT convergence module 114 via cross-layer exchange 500. In embodiments, the CT convergence module 114 may exchange information about the intent of the PT convergence module 110 to transmit reachability information with counterpart CT convergence modules (e.g., at other nodes 104) via the MANET waveform (e.g., CT communications 116/radio system 118). Further, when the CT convergence module 114 of node 102 learns that the PT convergence module 110 at a node 104 having user defined address X will transmit reachability information, the CT convergence module may perform an IGMP join for UEM-X. Accordingly, the PT convergence module 110 at node 102 may expect reachability information from the counterpart PT convergence module at node 104 (e.g., platform X), and may only request a PT message if a message is not already heard. In some embodiments, e.g., when all hosts 106 of the MANET 100 communicate exclusively via DAC or D1H, the PT convergence modules 110 of the various nodes 102, 104 of the MANET 100 may refrain from transmitting address reachability messages in order to reduce network overhead.

In embodiments, when the CT convergence module 114 of a node 102 learns of the intent of the PT convergence module 110 to transmit address reachability information, the CT convergence module may exchange PT transmission (Tx) flag information with the CT convergence modules of other nodes 104, e.g., via the MANET waveform (e.g., CT communications 116/radio system 118). By way of a non-limiting example, the PT convergence module 110 may redefine MANET GW messages sent to the CT convergence module 114 via cross-layer exchange 500 to indicate information to transmit (PT-Tx flag). However, this may eliminate the ability of some nodes 102, 104 of the MANET 100 to serve as gateway nodes. Alternatively, the PT convergence module 110 may add the PT-Tx flag to MANET control packets exchanged between the MANET nodes 102, 104 via CT communications 116. In some embodiments, reachability information may include quality of service (QOS) information (e.g., packet priority with respect to packets sent via CT communications 116) with respect to a reachable address, PT convergence module, and/or node 104 reachable from the PT convergence module 110 of the node 102.

In some embodiments, reachability information exchanged between PT convergence modules 110 of connected nodes 102, 104 (e.g., source/Tx node 102, destination/Rx/peer node 104) may include PT-to-CT addressing convergence. For example, CT reachability information exchanged with the source/Tx node 102 by the peer node 104 may provide for mapping of a peer CT interface 700 between the peer IPsec ECU 112 and the peer CT convergence module 114 of the peer node 104 (or, e.g., a mapping of an IP address (e.g., an IPIP address associated with IPIP packet 122, FIG. 1)) associated with the PT convergence modules 110 to a CT destination address (e.g., associated with the traffic packet 126, FIG. 1)).

Alternatively, CT reachability information may provide for mapping of a peer CT interface 702 between the peer IPSec ECU 112 and the peer CT communications module 116 of the peer node 104 (or, e.g., a mapping of the IPIP address to a node address of the peer node as determined by the peer CT communications module).

Further, reachability information exchanged between PT convergence modules may include PT reachability information. For example, PT reachability information may include mapping of IP addresses (e.g., IPIP packet 122) exchanged between PT convergence modules 110 at the node 102 and peer node 104 to IP addresses exchanged with user systems (e.g., PT destination addresses (e.g., associated with IP packet 120) of hosts 106 and/or routers 108 of the peer node 104.

In some embodiments, CT and PT reachability information may include UEM addresses provided via control traffic updates between the PT convergence modules 110 of the node 102 and peer node 104, e.g., for use by the peer CT convergence module 114 of the peer node in unicast equivalent multicast (UEM-X) joining of the node to a UEM group consisting exclusively of the peer node X. For example, PT destination addresses associated with PT reachability information may include a UEM address identifying the peer PT convergence module 110 at the peer node 104. Similarly, CT destination addresses associated with CT reachability information may include a UEM address identifying the CT interface 700, 702 at the peer node 104.

Referring now to FIG. 8, the MANET 100 may support segregation of user communications traffic between Multiple Independent Levels of Security (MILS) enclaves. For example, each MILS enclave may be associated with a specific MILS security level, e.g., MILS 0/US Secret; MILS 1/NATO Secret; MILS 2/Coalition (e.g., non-NATO ally) Secret; MILS 3/NATO Top Secret; MILS 4/National Secret. Each MILS enclave may have a separate IPSec ECU to which separate common keys and/or SA's are loaded for that MILS enclave. Similarly, within a MILS enclave, private keys may support further separation among users within that MILS enclave, e.g., Priv-1 for nation 1, Priv-2 for nations 4 and 5, Priv-3 for a special mission group.

In embodiments, the MANET-optimized IP network 100 many segregate single security level and Multiple Independent Levels of Security (MILS) traffic such that only MANET hosts in the same security enclave (e.g., MILS enclave 800 associated with MILS 3, MILS enclave 802 associated with MILS 2) can transmit and receive (Tx/Rx) to each other. For example, within a given MILS level, common groups may be established sharing a common key so all hosts within the MILS 2 enclave 802 can Tx/Rx to each other, e.g., the hosts 106 associated with the nodes 102, 104. Alternatively, a private group of two or more hosts sharing a private key may be established within a MILS enclave (e.g., the MILS 2 enclave 802). For example, if the node 104 is a member of a private group within the MILS 2 enclave 802 but the node 102 is not, only the node 104 may be able to Tx/Rx with other nodes of the private group using the private key, while the node 102 may not be able to decrypt these transmissions.

In embodiments, a node 102 may be a member of multiple MILS enclaves, e.g., MILS 3 enclave 800 and MILS 2 enclave 802. For example, the node 102 may share a common CT convergence module 114, CT communications module 116, and radio system 118, but separate and distinct IPSec ECUs 112, 112a; PT convergence modules 110, 110a; routers 108, 108a; and/or hosts 106, 106a for MILS 2 and MILS 3 respectively.

In embodiments, for any MILS level at which a node 102, 104 is operating, common key and/or private key communications addressing modes may be available based on the common and/or private groups of which the corresponding host/s 106, 106a, 106b is/are a member (e.g., which may be in turn based on the MILS enclave 800, 802 including the host). Further, all IPSec ECUs 112, 112a operating within a MILS enclave 800, 802 may use identical common Security Associations (SAs), e.g., IP addressing as described above. In embodiments, common key communications addressing modes may include:

Com-DAC mode (Common Default ALL-Cast), e.g., for common key communications multicast to all PT convergence modules 110 and/or hosts 106 in the same MILS enclave 800, 802 via their corresponding communications modules/radio systems 116/118, whether those nodes 102, 104 or systems are one hop away or two or more hops away;

Com-D1H mode (Default One-Hop Broadcast), e.g., for common key communications multicast to all PT convergence modules 110 and/or hosts 106 in the same MILS enclave exactly one hop away;

Com-PRE-X mode (Preconfigured-X), e.g., for common key communications multicast to hosts 106 and/or routers 108 with preconfigured addresses in the same MILS enclave via the CT communications 116/radio system 118; PRE-X traffic may include, for example, IP-over-IP encapsulated traffic (e.g., IPIP packets 122 sent over the MANET); and Com-UEM-X mode (Unicast-Equivalent Multicast-X), e.g., for common communications multicast to a single PT convergence module 110 (hence, a unicast-equivalent multicast (UEM)) in the same MILS enclave 802 (e.g., having joined the common group) via CT communications 116/radio system 118.

In some embodiments, common key communications may further include Network Address Translation (NAT) among MANET nodes 102, 104 of a common group.

In embodiments, the MANET 100 may support private key communications within a private group (where the private group is entirely within the same MILS enclave 802), and wherein all IPSec ECUs 112 within the private group have identical private SA's and PPKs. Private key communications addressing modes may include:

Priv-P-DAC mode (Common Default ALL-Cast), e.g., for private key communications multicast to all hosts 106 in the same Private P group in the same MILS enclave 802 (e.g., having joined the Priv-P multicast) via their corresponding MANET nodes 102, 104 and/or CT communications 116/radio systems 118, whether one radio (RF) hop away or two or more hops away;

Priv-P-D1H mode (Default One-Hop Broadcast), e.g., for private key communications multicast to all hosts 106 in the same Private P group in the same MILS enclave 802 (e.g., having joined the Priv-P-D1H multicast) and exactly one radio hop away, via their corresponding MANET nodes 102, 104 and/or CT communications 116/radio systems 118;

Priv-P-PRE-X mode (Preconfigured-X), e.g., for private key communications multicast to hosts 106 and/or routers 108 with preconfigured addresses in the same Private P group in the same MILS enclave 802, via their MANET waveforms/radio systems 118 (for example, Priv-P-PRE-X traffic may include IP-over-IP encapsulated traffic (e.g., IPIP packets 122) sent over the MANET 100); and Priv-P-UEM-X mode (Unicast-Equivalent Multicast-X), e.g., for private key communications multicast to a single PT convergence module 110 in the same MILS enclave 802 (e.g., having joined the Priv-P-UEM-X group).

In some embodiments, private key communications may further include Network Address Translation (NAT) among MANET nodes 102, 104 of a private group.

In embodiments, the IPSec ECU 112 may incorporate Internet Group Management Protocol (IGMP) and multicast SA's (e.g., as opposed to unicast SA's) for exchanging traffic between PT convergence modules 110 within the same MILS enclave 802 (e.g., via PT tunnel 404), as described below. For example, by loading the same multicast SA's and MILS enclave common keys to each IPsec ECU 112 in the same enclave 802, SA and IPSec key generation may be significantly simplified. Further, nodes 102, 104 in private groups (e.g., and exchanging Priv-P traffic) may also load the same set of private traffic multicast SA's and MILS enclave private keys to their respective IPsec ECUs 112.

I claim:

1. A communications node of a communications network, the communications node comprising:

at least one plaintext (PT) user system configured for output and input of traffic communicated between the communications node and at least one of a receiving (Rx) node or a transmitting (Tx) node of the communications network according to one or more internet protocol (IP) security (IPSec) protocols;

at least one PT convergence module operatively coupled to the PT user system;

at least one ciphertext (CT) communications module configured for 1) transmission of the output traffic to the at least one Rx node and 2) reception of the input traffic from the at least one Tx node according to one or more network waveforms associated with the communications network;

at least one CT convergence module operatively coupled to the CT communications module;

at least one IPSec cryptographic unit operatively coupled to the PT convergence module and to the CT convergence module, the IPSec cryptographic unit configured for:

encryption of output traffic and decryption of input traffic according to the one or more IPSec protocols; and exchange of cross-layer information between the PT convergence module and the CT convergence module;

wherein the at least one PT convergence module is configured to:

map the output traffic to at least one CT capability associated with the CT communications module prior to encryption by the IPSec cryptographic unit, wherein the at least one CT capability includes one or more of a) a CT destination address of the receiving node, b) a quality of service (QOS) priority associated with the output traffic, or c) a packet size associated with the CT communications module;

converge decrypted input traffic based on the at least one CT capability; and exchange reachability information with at least one peer PT convergence module of a peer node of the communications network; and wherein the at least one CT convergence module is configured to:

converge encrypted output traffic and encrypted input traffic based on the at least one CT capability.

2. The communications node of claim 1, wherein the reachability information includes at least one of:

CT reachability information associated with a peer CT interface between a peer IPSec cryptographic unit of the peer node and a peer CT communications module of the peer node;

CT reachability information associated with a peer CT interface between the peer IPSec cryptographic unit and a peer CT convergence module of the peer node; or PT reachability information associated with at least one of a peer host or a peer router connected to the peer PT convergence module.

3. The communications node of claim 2, wherein the PT reachability information includes a unicast equivalent multicast (UEM) address corresponding to the peer PT convergence module.

4. The communications node of claim 2, wherein the CT reachability information includes a unicast equivalent multicast (UEM) address corresponding to the peer CT interface.

5. The communications node of claim 2, wherein the at least one PT convergence module is configured for exchange of at least one of the input traffic or the output traffic with the at least one peer PT convergence module via a PT tunnel.

6. The communications node of claim 5, wherein the PT tunnel is associated with at least one of:

a default all-cast (DAC) exchange with every peer node of the communications network;

a default one-hop (D1H) exchange with every peer node one radio frequency (RF) hop away from the communications node;

or a unicast-equivalent multicast (UEM) to a multicast group consisting of a single peer node that has joined the multicast group.

7. The communications node of claim 5, wherein the PT tunnel is associated with at least one of:

a common group associated with all nodes of the communications network within a Multiple Independent Levels of Security (MILS) enclave;

or a private group associated with a subset of all nodes within a MILS enclave.

8. The communications node of claim 2, wherein the reachability information includes at least one of:

a number of relay hops between the communications node and the at least one peer CT convergence module;

a quality of service associated with the at least one peer CT convergence module;

a request for reserved capacity;

an indicator of reserved capacity responsive to the request;

or a node status associated with the at least one peer CT convergence module, wherein the node status is selected from a group including a gateway (GW) node status.

9. The communications node of claim 1, wherein the at least one CT communications module includes at least one radio frequency (RF) radio system configured for transmission of output traffic and reception of input traffic according to the one or more network waveforms.

10. The communications node of claim 9, wherein the cross-layer information includes a radio address of the RF radio system.

11. The communications node of claim 1, wherein the communications network is one of:

a homogeneous network corresponding to a network type selected from a group including fiber, optical, cellular, IP, RF, or MANET;

or a heterogeneous network associated with two or more network types selected from the group.

12. The communications node of claim 1, wherein at least one IPSec cryptographic unit is configured for exchange of the cross-layer information between the PT convergence module and CT convergence module via Internet Control Message Protocol (IGMP) bypass.

13. The communications node of claim 12, wherein the cross-layer information includes at least one IGMP address indicative of one or more of a message type and message content.

14. The communications node of claim 13, wherein the message content includes one or more of:

quality of service (QOS) information associated with the CT convergence module;

a mapping of the QOS information to at least one Differentiated Services Code Point (DSCP);

an identifier of a UEM group;

an indicator that a peer node is one RF hop from the communications node;

an indicator that a peer node is at least two RF hops from the communications node;

a gateway (GW) node status of a peer node;

or an indicator of the reachability information.

15. The communications node of claim 1, wherein the PT convergence module is configured for:

pre-encryption of output traffic prior to encryption by the at least one IPSec cryptographic unit;

and post-decryption of input traffic subsequent to decryption by the at least one IPSec cryptographic unit.

16. The communications node of claim 1, wherein at least one of the CT convergence module or the CT communications module is configured for:

post-encryption of output traffic subsequent to encryption by the at least one IPSec cryptographic unit;

and pre-decryption of input traffic prior to decryption by the at least one IPSec cryptographic unit.

17. The communications node of claim 1, wherein:

the communication node is associated with two or more Multiple Independent Levels of Security (MILS) enclaves, each MILS enclave corresponding to a MILS security level and separated from each other MILS enclave;

and wherein the at least one PT convergence module includes at least one distinct PT convergence module corresponding to each MILS enclave.

* * * * *